(12) United States Patent
Ando et al.

(10) Patent No.: US 10,557,937 B2
(45) Date of Patent: Feb. 11, 2020

(54) SHIP SPEED METER AND SHIP SPEED MEASUREMENT METHOD

(71) Applicant: Nippon Yusen Kabushiki Kaisha, Tokyo (JP)

(72) Inventors: Hideyuki Ando, Tokyo (JP); Masatoshi Hori, Tokyo (JP); Ryo Kakuta, Tokyo (JP)

(73) Assignee: NIPPON YUSEN KABUSHIKI KAISHA, Chiyoda-ku, Tokyo (JP)

( * ) Notice: Subject to any disclaimer, the term of this patent is extended or adjusted under 35 U.S.C. 154(b) by 1356 days.

(21) Appl. No.: 14/378,897

(22) PCT Filed: Feb. 4, 2013

(86) PCT No.: PCT/JP2013/052486
§ 371 (c)(1),
(2) Date: Aug. 14, 2014

(87) PCT Pub. No.: WO2013/121913
PCT Pub. Date: Aug. 22, 2013

(65) Prior Publication Data
US 2015/0025834 A1    Jan. 22, 2015

(30) Foreign Application Priority Data

Feb. 16, 2012 (JP) ................................ 2012-031539

(51) Int. Cl.
*G01S 15/88* (2006.01)
*B63B 49/00* (2006.01)
(Continued)

(52) U.S. Cl.
CPC .............. *G01S 15/88* (2013.01); *B63B 49/00* (2013.01); *G01P 3/02* (2013.01); *G01P 3/26* (2013.01);
(Continued)

(58) Field of Classification Search
CPC ......... B63B 49/00; G01S 15/60; G01S 15/88; G01P 5/241; G01P 5/02; G01P 5/26; G01P 5/50; B63J 2099/008
(Continued)

(56) References Cited

U.S. PATENT DOCUMENTS 3,738,164 A * 6/1973 Sanford ............... G01C 13/006
                                                        73/170.04
4,038,629 A * 7/1977 van der Burgt ......... G01H 5/00
                                                        367/151
(Continued)

FOREIGN PATENT DOCUMENTS

CN      101400567 A      4/2009
CN      101990511 A      3/2011
(Continued)

OTHER PUBLICATIONS

Tetley, L., & Calcutt, D. (2001). Chapter 3: Speed measurement. Electronic Navigation Systems (Third Edition) (vol. 42, pp. 45-87). Elsevier Ltd.
(Continued)

*Primary Examiner* — Vongsavanh Sengdara
(74) *Attorney, Agent, or Firm* — McCormick, Paulding & Huber PLLC

(57) ABSTRACT

A ship's speed meter for measuring a speed relative to the water of a ship 10, the ship's speed meter including a wave transmitter 1 for emitting a sound wave toward a sea bottom 20, a wave receiver 2 for detecting a plurality of reflected waves, which are reflected waves of the sound wave having been emitted from the wave transmitter 1, reflected by a plurality of reflecting objects 30 positioned at different water depths, and an arithmetic processing unit 4 for calculating a ship's speed relative to the water of the ship 10 based on a frequency difference of the sound wave and the reflected wave. The arithmetic processing unit 4 obtains a change rate
(Continued)

of a current velocity in a water depth direction by obtaining current velocities at a plurality of different water depths based on a frequency difference between the sound wave and the plurality of reflected waves, and calculates a current velocity at a water depth at which the change rate is smaller than or equal to a threshold value as the ship's speed relative to the water of the ship 10.

4 Claims, 5 Drawing Sheets

(51) Int. Cl.
*G01S 15/60* (2006.01)
*G01P 5/24* (2006.01)
*G01P 3/02* (2006.01)
*G01P 3/26* (2006.01)
*G01P 3/50* (2006.01)
*B63J 99/00* (2009.01)

(52) U.S. Cl.
CPC .............. *G01P 3/50* (2013.01); *G01P 5/241* (2013.01); *G01S 15/60* (2013.01); *B63J 2099/008* (2013.01)

(58) Field of Classification Search
USPC ......................................................... 702/143
See application file for complete search history.

(56) References Cited

U.S. PATENT DOCUMENTS

| | | | | |
|---|---|---|---|---|
| 4,287,578 | A * | 9/1981 | Heyser | G01S 13/26 367/100 |
| 4,404,665 | A * | 9/1983 | Kits van Heyningen | G01S 7/526 367/100 |
| 5,077,700 | A | 12/1991 | Shaw et al. | |
| 5,122,990 | A * | 6/1992 | Deines | G01S 15/101 367/100 |
| 5,208,785 | A * | 5/1993 | Brumley | G01S 15/582 367/90 |
| 2008/0080314 | A1 | 4/2008 | Brumley et al. | |
| 2010/0142324 | A1* | 6/2010 | Vogt | G01C 13/00 367/88 |
| 2011/0202278 | A1* | 8/2011 | Caute | G01S 7/003 702/14 |

FOREIGN PATENT DOCUMENTS

| | | |
|---|---|---|
| JP | 58039971 | 3/1983 |
| JP | 1054732 | 2/1998 |
| JP | 2005114478 A | 4/2005 |
| JP | 4021830 B2 | 12/2007 |

OTHER PUBLICATIONS

International Search Report for PCT Application No. PCT/JP2013/052486 dated Mar. 29, 2013.

"Out of Tolerance Phenomenon of the Log and Analysis", Baohai Chu et al., Ship & Boat, No. 5, 1990 and a English-language version of Chinese Office Action indicating the degree of relevance found by the Chinese Patent Office.

Chinese Office Action and English Translation received in Chinese Patent Application Serial No. 201380009690.0 dated Apr. 15, 2016.

European Search Report for European Patent Application No. EP13749496 dated Sep. 8, 2015.

Article entitled " CIVE 1400: An Introduction to Fluid Mechanics" by Dr. P A Sleigh. Jan. 2008 (pp. 178-245).

English Translation of Chinese Office Action for Chinese Application No. 201380009690.0 dated Aug. 3, 2015.

* cited by examiner

SHIP SPEED METER AND SHIP SPEED MEASUREMENT METHOD

CROSS REFERENCE TO RELATED APPLICATION

This application is entitled to the benefit of and incorporates by reference subject matter disclosed in International Patent Application No. PCT/JP2013/052486 filed on Feb. 4, 2013 and Japanese Patent Application No. JP2012031539 filed on Feb. 16, 2012.

TECHNICAL FIELD

The present invention relates to a meter and a method of measuring a log speed of a ship.

BACKGROUND ART

Types of ship's speed meters for measuring a ship's speed relative to the water include an electromagnetic type, an acoustic type, a rotary-wing type, etc. Among these ship's speed meters, the electromagnetic ship's speed meter measures a ship's speed relative to the water using the law of electromagnetic induction. More specifically, the electromagnetic ship's speed meter is a sensor provided to a hull, the sensor including a coil for producing a magnetic field by being excited and one pair of electrodes for detecting electromotive force. When the magnetic field around the coil is moved with respect to a conductor (e.g., seawater) as the hull moves, induced electromotive force is detected by the electrodes. Here, when the magnetic field is constant, the electromotive force is proportional to the moving speed of the magnetic field (hull). Thus, the ship's speed relative to the water can be obtained based on the magnitude of the electromotive force.

In contrast, the acoustic ship's speed meter (sometimes called "Doppler log") measures a ship's speed relative to the water using the Doppler effect. More specifically, the acoustic ship's speed meter has a wave transmitter and a wave receiver provided to a hull. The wave transmitter and the wave receiver may be integrated or separated. In both cases, the wave transmitter emits sound waves to the bottom of water and the wave receiver detects sound waves reflected by the bottom of water or by suspended matter in water (such as plankton, garbage, etc.). Hereinafter, the bottom of water and suspended matter in water reflecting sound waves emitted from a wave transmitter will be collectively called "reflection object".

When sound waves emitted from a hull (wave transmitter) are reflected by a reflection object and returns to the hull (wave receiver), if there is a relative speed between the hull and the reflection object, a frequency difference (fd) corresponding to the relative speed is generated between the frequency of the sound waves emitted from the wave transmitter and the sound waves detected by the wave receiver. Thus, a ship's speed relative to the water can be obtained by obtaining the frequency difference (fd) and subjecting the frequency difference (fd) to an arithmetic processing. More specifically, a frequency (fm) of a sound wave emitted from a hull (wave transmitter) and reflected by a reflection object and a frequency (fr) of a sound wave returning to the hull (wave receiver) are expressed by the following equations.

$$fm = ft * C / (C - V * \cos\theta)$$

$$fr = fm * (C + V * \cos\theta) / C$$
$$= ft * (C + V * \cos\theta) / (C - V * \cos\theta)$$

Here,
ft: frequency of a sound wave emitted from a hull;
fm: frequency of sound wave observed at a reflection object;
fr: frequency of a sound wave observed again at the hull;
C: sound speed in sea water
V: ship's speed relative to the water (=current velocity)
θ: emitting angle of sound wave.

Thus, a frequency difference (fd) can be expressed as follows using the speed of a ship relative to the water.

$$fd = fr - ft = ft * (C + V * \cos\theta) / (C - V * \cos\theta) - ft \quad \text{Formula (1)}$$
$$= 2 * V * ft * \cos\theta / (C - V * \cos\theta)$$
$$= 2 * V * ft * \cos\theta / C \ldots \text{(since } C \gg V * \cos\theta\text{)}$$
$$\Rightarrow V = C * (fr - ft) / (2 * ft * \cos\theta) = C * fd / (2 * ft * \cos\theta)$$

That is, by obtaining a frequency difference (fd) and subjecting the frequency difference (fd) to an arithmetic processing, a speed of a ship relative to the water can be obtained (see Tetley, L., & Calcutt, D. (2001). Chapter 3: Speed measurement. Electronic Navigation Systems (Third Edition) (Vol. 42, pp. 45-87). Elsevier Ltd.).

Here, when a hull moves in a fluid, a boundary layer is created near a surface of the hull in contact with the fluid. Influence of viscosity appears significantly in the boundary layer, making a speed gradient very large. On the other hand, the influence due to viscosity is little in an area outside the boundary layer (main course) and thus the fluid flows in almost the same manner as an ideal fluid. Thus, to obtain an accurate ship's speed relative to the water, it is needed to obtain a speed of a fluid (current velocity) outside the boundary layer.

Accordingly, there has been an existing electromagnetic ship's speed meter having a sensor provided to a tip of a measuring rod extended from a ship bottom. In addition, there has been an existing acoustic ship's speed meter for detecting a current velocity at several meters below the ship bottom.

DISCLOSURE OF THE INVENTION

In the existing electromagnetic ship's speed meter and acoustic ship's speed meter, only one measurement point based on a hypothetical thickness of a boundary layer has been set. For example, to the existing electromagnetic ship's speed meter, a sensor has been provided to a tip of a measurement rod that is longer than the hypothetical thickness of the boundary layer. In addition, by the existing acoustic ship's speed meter, the thickness of the boundary layer is assumed to be, for example, 2.0 m, and the current velocity (ship's speed relative to the water) has been obtained based on a sound wave reflected by a reflection object existing near a depth of 2.0 to 3.0 m below the surface of the water.

However, the thickness of an actual boundary layer varies depending on various factors. For example, depending on a status of fouling of a hull, pitching and rolling of a hull, current of the sea (side flow) in a direction crossing a travelling direction of the hull, etc. Thus, a measurement point being set based on the thickness of a hypothetical boundary layer may be actually positioned inside the boundary layer. In this case, it is obvious that a speed of a ship relative to the water cannot be accurately obtained.

A preferred aim of the present invention is to provide an instrument and a method capable of more accurately obtaining a ship's speed relative to the water.

A ship's speed meter of the present invention obtains a change rate of a current velocity in a depth direction of a fluid by obtaining a current velocity at a plurality of different depths in the fluid on which a ship is floating, and calculates a current velocity at a depth at which the change rate is smaller than or equal to a predetermined threshold value as a ship's speed relative to the water.

The ship's speed meter of the present invention includes: a wave transmitter for emitting a sound wave toward the bottom of water; a wave receiver for detecting a plurality of reflected waves of the sound wave emitted from the wave transmitter, the plurality of reflected waves being reflected by a plurality of reflection objects positioned at different water depths; and an arithmetic processing unit for calculating a ship's speed relative to the water based on a frequency difference between the sound wave and the reflected waves. The arithmetic processing unit obtains a change rate of a current velocity in a water depth direction by obtaining a current velocity at a plurality of different water depths based on frequency differences between the sound wave and the respective plurality of reflected waves, and calculates a current velocity at a depth of water at which the change rate is smaller than or equal to a predetermined threshold value as a ship's speed relative to the water.

The arithmetic processing unit of the ship's speed meter of the present invention performs, upon obtaining a change rate of a current velocity in a water depth direction: dividing a period from emission of the sound wave from the wave transmitter to emission of a next sound wave into a plurality of sampling periods; obtaining an average frequency of the plurality of reflection waves detected by the wave receiver in the sampling periods; and obtaining current velocities at a plurality of different water depths based on a frequency difference between the sound wave emitted from the wave transmitter and the average frequency of each of the sampling periods.

The ship's speed meter of the present invention includes: a measurement rod extendable in a fluid along a depth direction of the fluid; a sensor provided to the measurement rod including a coil for forming a magnetic field by being excited and an electrode for detecting electromotive force induced in accordance with movements of the magnetic field; and an arithmetic processing unit for calculating a ship's speed relative to the water based on a magnitude of the electromotive force detected by the sensor. The arithmetic processing unit obtains a change rate of a current velocity in a depth direction of the fluid by obtaining current velocities at a plurality of different depths based on the magnitude of the electromotive force detected by the sensor and a length of the measurement rod upon detecting the electromotive force; and the arithmetic processing unit calculates a current velocity at a depth at which the change rate is smaller than or equal to a predetermined threshold value as a ship's speed relative to the water.

A method of measuring a ship's speed of the present invention obtains a change rate of a current velocity in a depth direction by obtaining current velocities at a plurality of different depths in a fluid on which a ship is floating; and calculates a current velocity at a depth at which the change rate is lower than or equal to a predetermined threshold value as a ship's speed relative to the water.

A method of measuring a ship's speed includes: a first step of emitting a sound wave towards the bottom of water; a second step of detecting a plurality of reflected waves emitted towards the bottom of water and then reflected by a plurality of reflection objects positioned at different water depths; and a third step of calculating a ship's speed relative to the water based on a frequency difference between the sound wave and the reflected wave. In the third step, a change rate of a current velocity in a depth direction is obtained by obtaining current velocities at a plurality of different water depths based on frequency differences between the sound wave and the respective plurality of reflected waves, and a current velocity at a water depth at which the change rate is smaller than or equal to a threshold value is calculated as a ship's speed relative to the water.

In the third step of the method of measuring a ship's speed, upon obtaining a change rate of a current velocity in a water depth direction, a period from emission of the sound wave to emission of a next sound wave is divided into a plurality of sampling periods, an average frequency of the plurality of reflected waves detected in the sampling periods is obtained in each of the sampling periods, and current velocities at a plurality of different water depths are obtained based on a frequency difference between the sound wave and the average frequency in each of the sampling periods.

A method of measuring a ship's speed according to the present invention includes: a first step of extending and shrinking a measurement rod to which a coil for forming a magnetic field as being excited and a sensor having an electrode for detecting electromotive force induced along with movements of the magnetic field, the measurement rod being extended and shrunk in a fluid along a depth direction of the fluid; and a second step of calculating a ship's speed relative to the water based on a magnitude of the electromotive force detected by the sensor. In the second step, a change rate of a current velocity in the depth direction of the fluid is obtained by obtaining current velocities at a plurality of depths based on a magnitude of the electromotive force detected by the sensor and a length of the measurement rod upon detection of the electromotive force, and a current velocity at a depth at which the change rate is smaller than or equal to a predetermined threshold value is calculated as the ship's speed relative to the water.

According to the present invention, a meter and a method capable of obtaining a more accurate ship's speed relative to the water can be achieved.

BRIEF DESCRIPTIONS OF THE DRAWINGS

DETAILED DESCRIPTION

Figure 1:
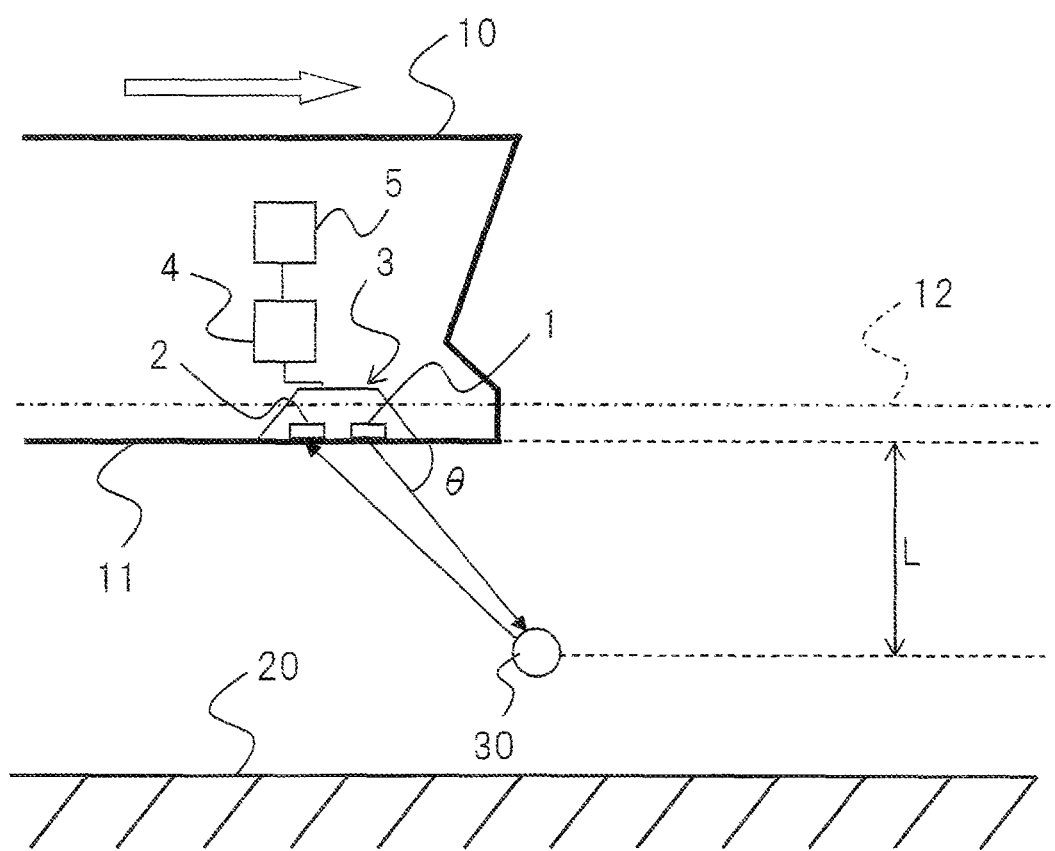
FIG. 1 is a block diagram illustrating an example of an aspect of a ship's speed meter of the present invention.

Hereinafter, an aspect of a ship's speed meter according to the present invention will be described. FIG. 1 is a block diagram illustrating an example of an aspect of a ship's speed meter of the present invention. The ship's speed meter according to the present aspect includes: a transducer 3 having a wave transmitter 1 and a wave receiver 2; an arithmetic processing unit 4 for calculating a speed relative to the water of a ship (ship's speed relative to the water) based on a frequency difference between sound waves transmitted and received by the transducer 3; and a display unit 5 for displaying the ship's speed relative to the water calculated by the arithmetic processing unit 4. Note that, while the wave transmitter 1 and the wave receiver 2 are illustrated separately as a matter of convenience in FIG. 1, the wave transmitter 1 and the wave receiver 2 are formed of single hardware in practice. More specifically, the transducer 3 has a single hardware having functions of transmitting and receiving sound waves, the functions of the hardware being switched by a control unit not illustrated.

The transducer 3 is provided to a ship bottom 11 of a ship 10 or in a vicinity of the ship bottom 11. The wave transmitter 1 of the transducer 3 emits a pulse sound wave at a predetermined frequency at an emission angle (θ) toward a sea bottom 20 ahead of a running direction of the ship 10. On the contrary, the wave receiver 2 of the transducer 3 detects a pulse sound wave emitted from the wave transmitter 1 and reflected by a reflection object 30. Note that, while only one reflection object 30 is illustrated in FIG. 1, it is clear that there are countless reflection objects in the sea. In the descriptions below, the pulse sound wave reflected by the reflection object 30 and detected by the wave receiver 2 will be called "reflected wave" to discriminate from the pulse sound wave emitted from the wave transmitter 1. It is needless to say that the discrimination is merely made as a matter of convenience of description.

The wave transmitter 1 of the transducer 3 illustrated in FIG. 1 emits a pulse sound wave at a constant time interval. The wave receiver 2 of the transducer 3 continuously detects reflected waves from the moment the pulse sound wave is emitted from the wave transmitter 1 to the moment the next pulse sound wave is emitted. That is, emission (transmission) of a pulse sound wave by the wave transmitter 1 and detection (reception) of a reflected wave by the wave receiver 2 are alternately repeated.

Here, taking a sound speed in sea water as (C) and a distance (reflection depth) from the ship bottom 11 to the reflection object 30 as (L), a time (t) required from emission of a pulse sound wave by the wave transmitter 1 to detection of a reflected wave by the wave receiver 2 is obtained by the following mathematical formula.

$$t = 2L(C*\sin\theta) \quad \text{Formula (2)}$$

Note that the ship bottom 11 of the ship 10 is positioned below a water surface (waterline) 12. Meanwhile, the reflection depth (L) in the present specification is a distance along a vertical line from the ship bottom 11 to the reflection object 30. That is, the reflection depth (L) is smaller (shallower) than a water depth that is a distance along a vertical line from the water surface 12 to the reflection object 30.

Figure 2A:
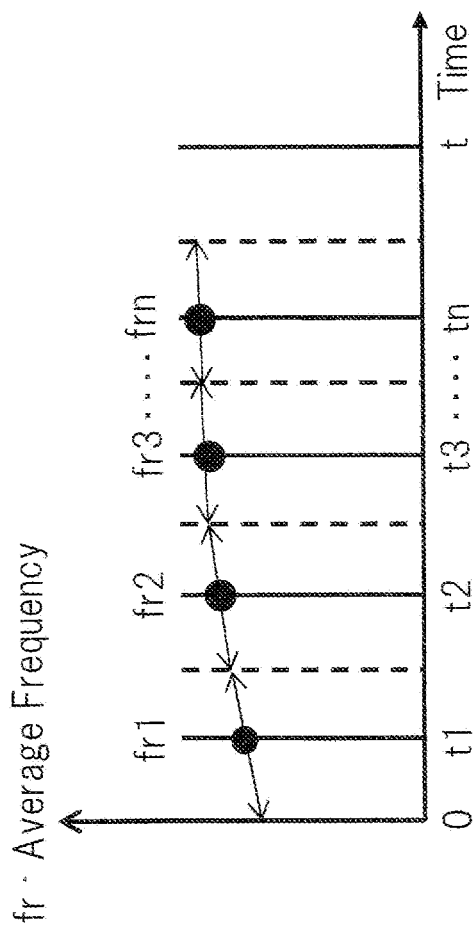
FIG. 2 is a schematic diagram illustrating a processing content in an arithmetic processing unit.
Figure 2B:
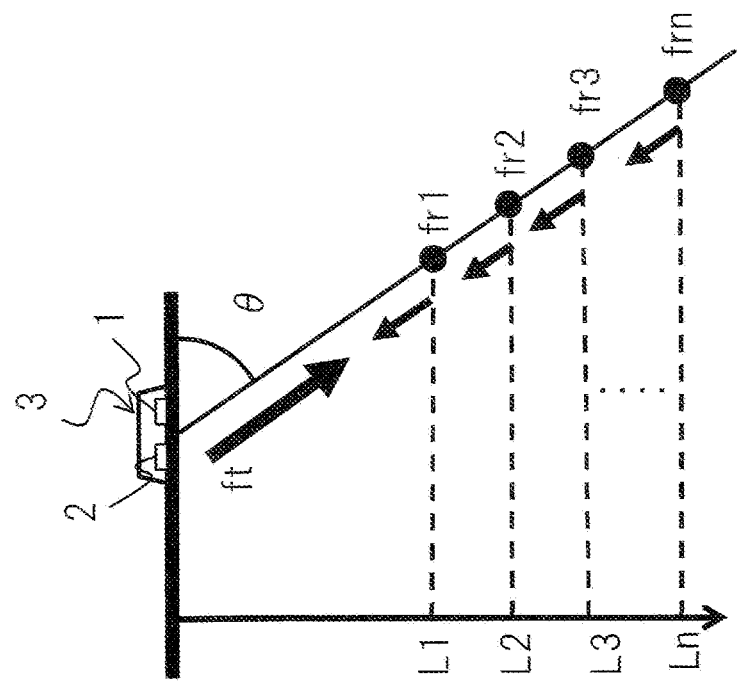
Figure 3:
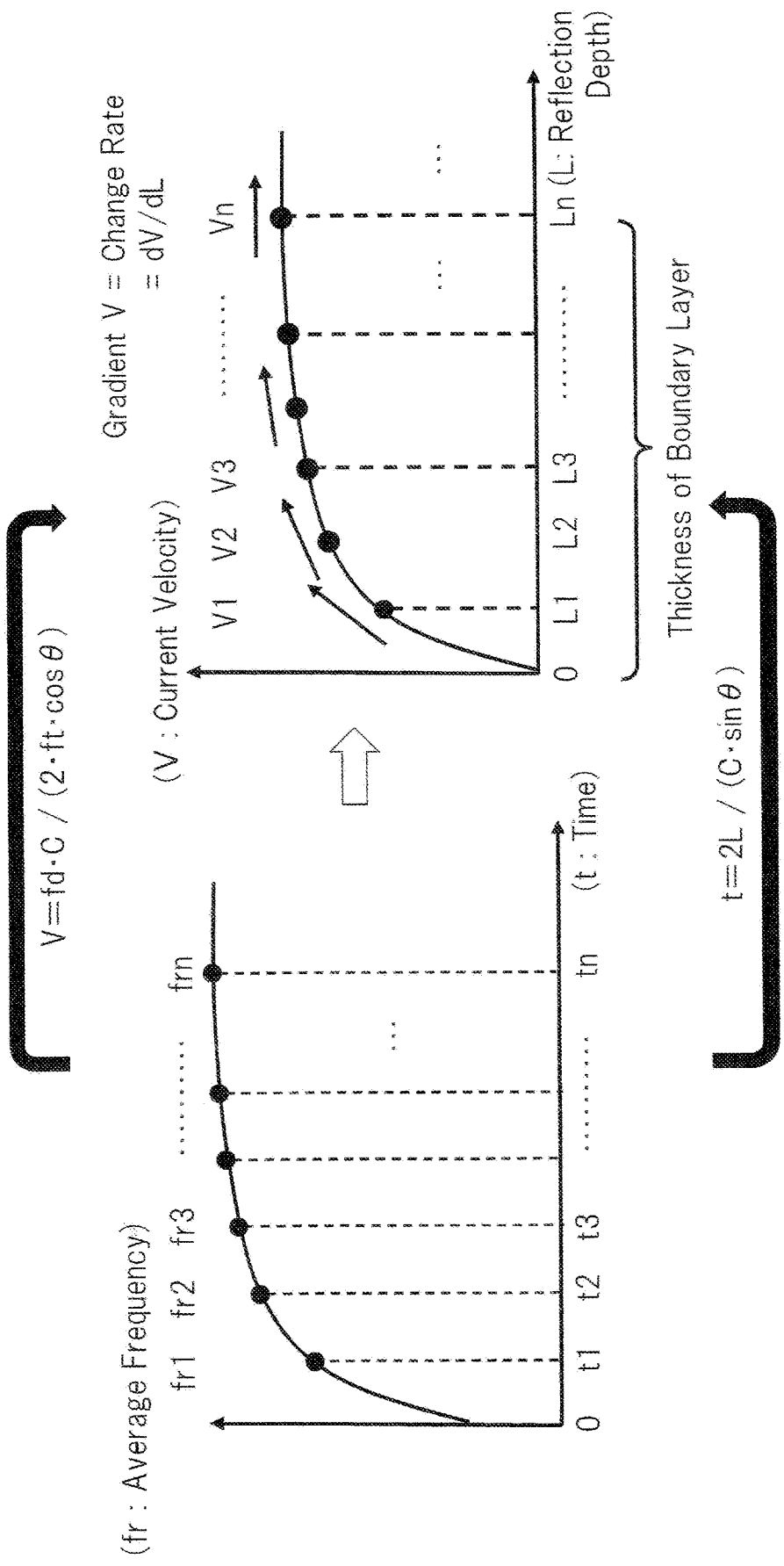
FIG. 3 is another schematic diagram illustrating the processing content in the arithmetic processing unit.

As illustrated in FIGS. 2A and 2B, the arithmetic processing unit 4 (FIG. 1) discriminates the plurality of reflected waves detected by the wave receiver 2 based on a relation of the time (t) and the reflection depth (L). More specifically, the arithmetic processing unit 4 (FIG. 1) divides a period from emission of a pulse sound wave from the wave transmitter 1 to emission of the next pulse sound wave into a plurality of sampling periods having a certain length. In addition, the arithmetic processing unit 4 obtains average frequencies (fr1, fr2, fr3 ... fm) of the plurality of reflected waves detected within the sampling periods regarding each of the sampling periods. Further, the arithmetic processing unit 4 compares each of the average frequencies (fr1, fr2, fr3 ... frn) and the frequency (ft) of the pulse sound wave, respectively, to obtain frequency differences (fd1, fd2, fd3, ... fdn) of each of the reflection depths (L1, L2, L3 ... Ln). Next, the arithmetic processing unit 4 obtains current velocities (V1, V2, V3, ... Vn) at each of the reflection depths (L1, L2, L3 ... Ln) based on each of the frequency differences (fd1, fd2, fd3, ... fdn). Accordingly, as illustrated in FIG. 3, a change rate (dV/dL) of the current velocity in the reflection depth direction (water depth direction) is figured out. In other words, a growth rate of the current velocity in a boundary layer is figured out. The arithmetic processing unit 4 considers the reflection depth (Ln) at which the change rate (dV/dL) is minimum (dV/dL≈0) as a thickness of the boundary layer and calculates a current velocity (Vn) at the reflection depth (Ln) as a ship's speed relative to the water. More specifically, a threshold value regarding a change rate (dV/dL) is previously set and the arithmetic processing unit 4 sees the reflection depth (Ln) at which the change rate (dV/dL) is smaller than or equal to the threshold voltage as the thickness of the boundary layer, and calculates a current velocity (Vn) as a ship's speed relative to the water. The ship's speed relative to the water calculated by the arithmetic processing unit 4 is displayed on the display unit 5 (FIG. 1). The display unit 5 can display, simultaneously or in a switching manner, the ship's speed relative to the water, the value indicating a change rate (dV/dL) of the current velocity and a graph illustrating the change rate (dV/dL).

Note that the threshold value may have ranges. In this case, a reflection depth (Ln) at which the change rate (dV/dL) is within a predetermined value range is considered as the thickness of the boundary layer and a current velocity (Vn) at the depth is calculated as a ship's speed relative to the water.

As described in the foregoing, the ship's speed meter of the present invention figures out an actual thickness of a boundary layer by obtaining current velocities at a plurality of points under a ship bottom to obtain a ship's speed relative to the water based on a current velocity outside the boundary layer. Thus, even when the thickness of the boundary layer due to various factors, an accurate ship's speed relative to the water can be always obtained.

Example 1

Hereinafter, an example of the present invention will be described. In the present example, a current velocity was obtained at a 1.0 mm interval in a water depth using a ship's speed meter having a configuration described in the embodiment described above. In addition, a current velocity (V) at a reflection depth (L) at which a change rate (dV/dL) of current velocity is 0 (zero) was taken as a ship's speed relative to the water. Hereinafter, details will be described.

In the present example, the sound speed C in sea water was taken as 1500 (m/s), a frequency (ft) of a pulse sound wave emitted from the wave transmitter 1 of the transducer 3 was taken as 400,000 (Hz), and an emitting angle (θ) of the pulse sound wave was taken as 60 (deg.).

In addition, a length of each sampling period was taken as 0.000002 (sec) and a reflection depth L (m) was obtained using the formula (2) based on a time t (sec) taken from emission of the pulse sound wave by the wave transmitter 1 to detection of a reflected wave by the wave receiver 2. Further, a current velocity V (m/s) was obtained by the formula (1).

Figure 4:
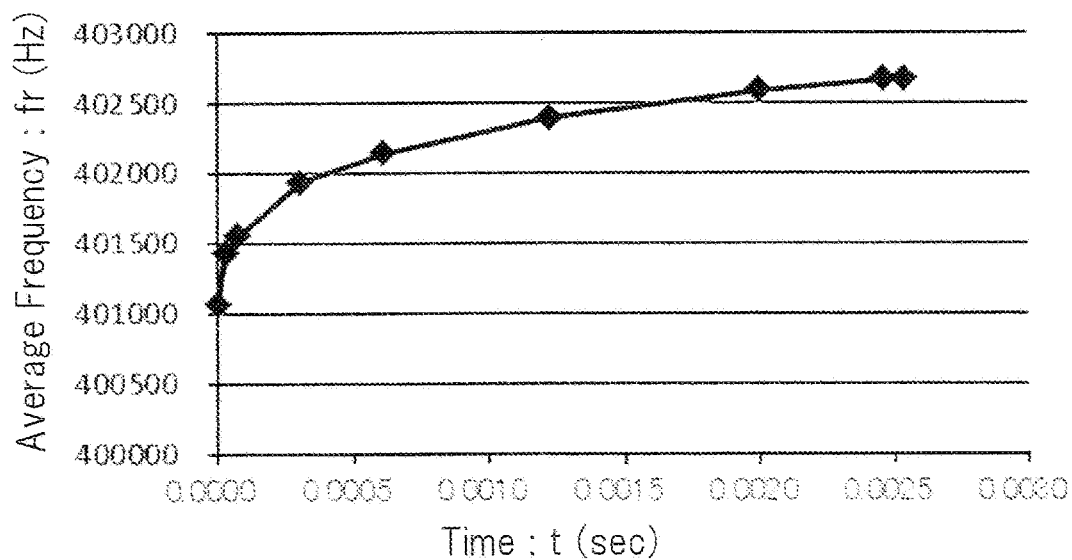
FIG. 4 is a diagram illustrating a relationship of an average frequency and time.
Figure 5:
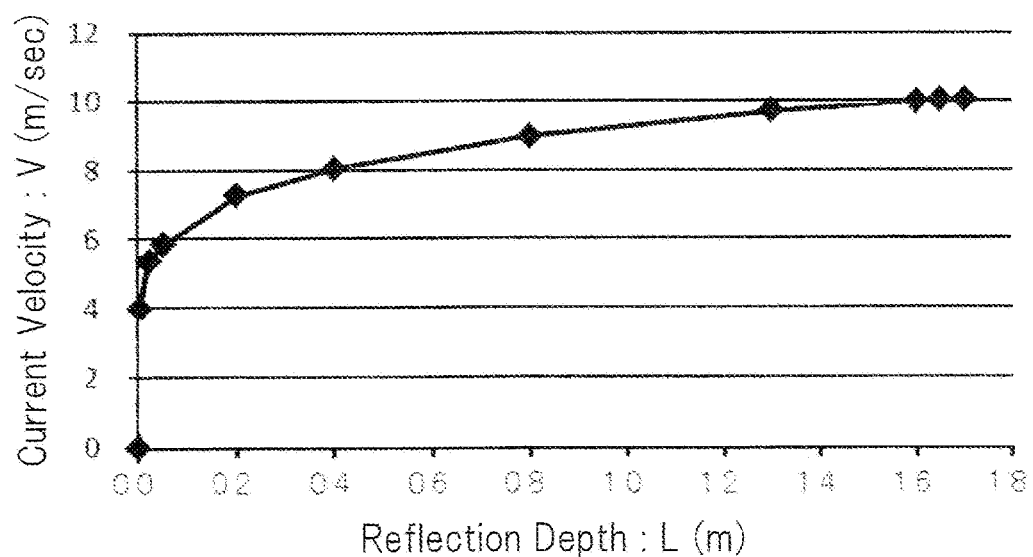
FIG. 5 is a diagram illustrating a relationship of a current velocity and a reflection depth.

Results of simulations carried out on the premise explained above are shown in Table 1. In addition, a relationship of the time t (sec) and an average frequency (Hz) in each sampling period is shown in FIG. 4. Further, a relationship of the reflection depth L (m) and the current velocity V (m/s) is shown in FIG. 5.

respect to the horizontal plane of the pulse sound wave emitted toward the sea bottom ahead in the travelling direction of the ship from the wave transmitter of the first transducer is smaller than that with no trim happening. Meanwhile, an angle θ' with respect to the horizontal plane of the pulse sound wave emitted toward the sea bottom behind in the travelling direction of the ship from the wave transmitter of the second transducer is larger than that with no trim happening. Accordingly, by obtaining a frequency difference (fd) of a pulse sound wave and a reflected wave and a current velocity (V) in accordance with the following mathematical formulae, a measurement error due to influences of the trim can be smaller.

TABLE 1

|  | Reflection Depth (m) | Average Frequency fr (Hz) | Time t (s) | Frequency Difference fd (Hz) | Flow Speed V (m/s) | Change Rate dV/dL |
|---|---|---|---|---|---|---|
|  | 0.000 |  |  |  | 0.0 |  |
|  | 0.001 | 401.067 | 0.000002 | 1.067 | 4.0 | 4000 |
|  | 0.020 | 401.430 | 0.000031 | 1.430 | 5.4 | 71 |
|  | 0.050 | 401.555 | 0.000077 | 1.555 | 5.8 | 15 |
|  | 0.200 | 401.938 | 0.000308 | 1.938 | 7.3 | 9 |
|  | 0.400 | 402.141 | 0.000616 | 2.141 | 8.0 | 3 |
|  | 0.800 | 402.393 | 0.001232 | 2.393 | 9.0 | 2 |
|  | 1.300 | 402.590 | 0.002001 | 2.590 | 9.7 | 1 |
| Flow Speed Stablized | 1.600 | 402.665 | 0.002463 | 2.665 | 10.0 | 0 |
|  | 1.650 | 402.673 | 0.002540 | 2.673 | 10.0 | 0 |
|  | . | . | . | . | . | . |
|  | . | . | . | . | . | . |
|  | . | . | . | . | . | . |
|  | 10.00 | 402.673 | 0.015396 | 2.673 | 10.0 | 0 |

According to Table 1, when the reflection depth (L) is 1.600 (m), the change rate (dV/dL) is 0 (zero). In this case, since the thickness of the boundary layer is considered to be less than 1.600 (m), the arithmetic processing unit 4 (FIG. 1) calculates such that 10.0 (m/s) that is a current velocity at a depth deeper than or equal to a reflection depth (L) of 1.600 (m) is a ship's speed relative to the water.

The present invention is not limited to the foregoing embodiment and example, and various modifications and alterations can be made within the scope of the present invention. For example, in the embodiment described above, calculations have been carried out taking a difference between an average frequency of a plurality of reflection waves detected within each sampling period and a pulse sound wave as a frequency difference per reflection depth. However, a difference between an optional one reflection wave detected within each sampling period and a pulse sound wave may be taken as a frequency difference per reflection depth to calculate.

In addition, while the current velocity has been obtained by a unidirectional pulse emission in the embodiment described above, there is another embodiment obtaining a current velocity by bidirectional pulse emission. More specifically, at least two transducers are prepared and a pulse sound wave is emitted from a wave transmitter of the first transducer toward a first direction (for example, toward the sea bottom ahead in the travelling direction of the ship) and a reflected wave of the sound wave is detected by a wave receiver of the first transducer. On the other hand, a pulse sound wave is emitted from a wave transmitted of a second transducer in the opposite direction of the first direction (for example, toward the sea bottom behind in the travelling direction of the ship) and a reflected wave of the sound wave is detected by a wave receiver of the second transducer. In this case, when a trim by stern happens, an angle θ with $fd = 2 * V * fr * (\cos θ + \cos θ')/C \Rightarrow C * fd/\{2 * fr * (\cos θ + \cos θ')\}$ In addition, as the sound speed (C) in the sea water varies depending on the level of salt, the water temperature, etc., it is preferable to correct the current velocity (ship's speed relative to the water) with detecting these factors.

Further, states of the boundary layer, current velocity, and current of the sea can be two-dimensionally understood too when, in addition to the forward and backward directions of the travelling direction of the ship, the pulse sound wave is emitted also in the left and right directions of the travelling direction and a reflected wave of the pulse sound wave is detected. In addition, the measurement error can be further reduced and states of the boundary layer, current velocity, and current of the sea can be three-dimensionally understood too when the pulse sound wave is emitted in three or more directions and the current velocity is calculated based on a frequency difference between frequency of the pulse sound wave and its reflected wave.

Figure 6:
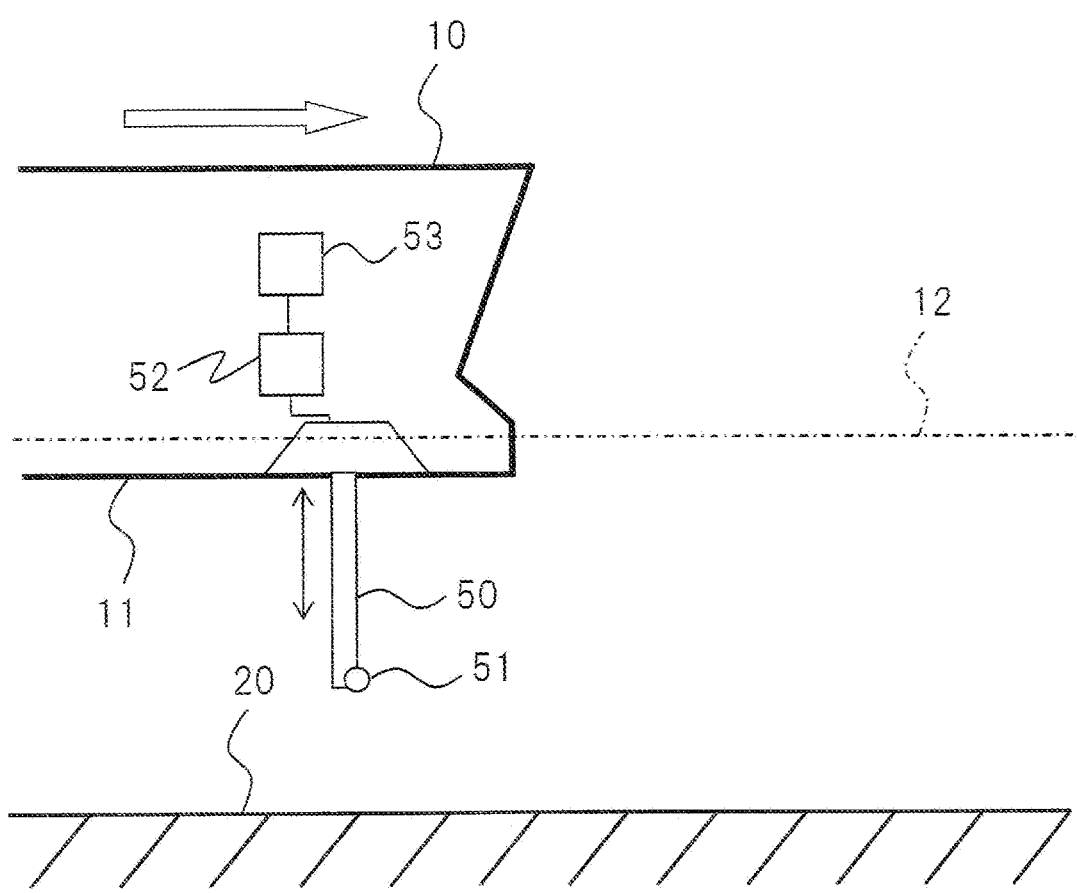
FIG. 6 is a block diagram illustrating another example of an aspect of a ship's speed meter of the present invention.

While the descriptions have been made regarding an acoustic ship's speed meter in which the present invention is used in the foregoing, the present invention can be also used in an electromagnetic ship's speed meter. An embodiment of an electromagnetic ship's speed meter in which the present invention is used is illustrated in FIG. 6. The illustrated ship's speed meter includes: a measurement rod 50 provided to a ship bottom 11 of a ship 10 so as to be extendable in a depth direction in the sea; a sensor 51 provided to a tip of the measurement rod 50; an arithmetic processing unit 52 for calculating a ship's speed relative to the water based on a detection result of the sensor 51; and a display unit 53 for displaying the ship's speed relative to the water calculated by the arithmetic processing unit 52.

While illustration is omitted, the sensor 51 has a coil for forming a magnetic field as being excited and a pair of electrodes for detecting electromotive force induced as the magnetic field is moved. The arithmetic processing unit 52 obtains a magnitude of the electromotive force detected by the sensor 51 and current velocities at a plurality of different water depths based on the length of the measurement rod 50 upon detecting the electromotive force. The arithmetic processing unit 52 obtains a change rate of the current velocity in a water depth direction. The arithmetic processing unit 52 calculates, as a ship's speed relative to the water, a current velocity at a water depth at which the change rate is smaller than or equal to a predetermined threshold value.

The measurement rod 50 is extended toward a sea bottom 20 by driving force outputted from an electric motor not illustrated. Alternatively, after being extended toward the sea bottom 20, the measurement rod 50 is shortened toward the ship bottom 11. More specifically, between the electric motor and the measurement rod 50, a transmission mechanism (for example, a rack and pinion) for converting the rotational motion of the electric motor into linear motion and transmitting the same to the measurement rod 50 is interposed. By the driving force transmitted via the transmission mechanism, the measurement rod 50 is extended and shortened.

To the arithmetic processing unit 52, a signal is inputted indicating electromotive force or a magnitude of the electromagnetic force detected by the electrodes of the sensor 51 during extension and shortening of the measurement rod 50. Also, to the arithmetic processing unit 52, a signal or information for obtaining a length of the measurement rod 50 is inputted. For example, a rotation amount and/or rotation number of an optional gear composing the transmission mechanism is detected by an encoder and a signal or information indicating a detection result of the rotation amount and/or rotation number is inputted to the arithmetic processing unit 52. Alternatively, a signal or information for notifying that the electric motor is activated is inputted to the arithmetic processing unit 52. In this case, the arithmetic processing unit 52 counts an elapsed time from an input of a signal or information for notifying activation of the electric motor and obtains the length of the measurement rod 50 by collating the elapsed time with previously prepared data. It is needless to say that this data indicates a correspondence between the driving time of the electric motor and the length of the measurement rod 50.

The arithmetic processing unit 52 obtains a relationship of a plurality of electromotive forces detected by the sensor 51 while the measurement rod 50 is being extended and shortened and the length of the measurement rod upon detecting the respective electromotive forces. Then, the arithmetic processing unit 52 obtains current velocities at a plurality of different water depths based on the relationship, obtains a change rate of the current velocities in the water depth direction, and calculates a current velocity at a water depth at which the change rate is smaller than or equal to a predetermined threshold value as a ship's speed relative to the water. Here, as the sensor 51 is provided to a tip of the measurement rod 50, the arithmetic processing unit 52 treats the length of the measurement rod as a water depth (=distance from the ship bottom 11 to the sensor 51). However, when the sensor 51 is provided to another place than the tip of the measurement rod 50, a length from the providing position of the sensor 51 to the tip of the measurement rod 50 is deducted. In any cases, the arithmetic processing unit 52 obtains a distance from the ship bottom 11 to the sensor 51 based on the length of the measurement rod 50 and performs computation taking the distance as the water depth.

Examples of embodiments of the present invention have been described exemplifying a ship moving on the sea in the present specification. However, according to the ship's speed meter and method of measuring a ship's speed of the present invention, ship's speeds relative to the water of any surface ships can be accurately obtained.

While the present invention has been illustrated and described with respect to a particular embodiment thereof, it should be appreciated by those of ordinary skill in the art that various modifications to this invention may be made without departing from the spirit and scope of the present.

What is claimed is:

1. A ship's speed meter for measuring a speed of a ship relative to water on which the ship is floating, the ship's speed meter comprising:
    a wave transmitter configured to emit a sound wave toward a bottom of the water on which the ship is floating;
    a wave receiver configured to detect a plurality of reflected waves reflected by a plurality of reflecting objects respectively positioned at different water depths, the reflected waves being respectively waves obtained by reflecting the sound wave emitted from the wave transmitter by means of the plurality of reflecting objects; and
    an arithmetic processing unit configured to calculate the speed of the ship relative to the water on which the ship is floating based on a frequency difference between the sound wave and each of the reflected waves,
    wherein the arithmetic processing unit is further configured to:
    calculate a current velocity at each of a plurality of different depths based on the frequency difference between the sound wave and the corresponding reflected wave;
    calculate a change rate of the current velocity in a depth direction of the water based on the calculated current velocities;
    specify one of the depths at which the change rate is substantially zero as a thickness of a boundary layer; and
    obtain the current velocity at the specified depth as the speed of the ship relative to the water on which the ship is floating.

2. The ship's speed meter according to claim 1,
    wherein the arithmetic processing unit is configured to:
    divide a period from emission of a sound wave from the wave transmitter to emission of a next sound wave into a plurality of sampling periods upon obtaining the change rate of the current velocities in the water depth direction;
    obtain, in each of the sampling periods, an average frequency of the plurality of reflected waves detected by the wave receiver in the sampling period; and
    obtain current velocities at a plurality of different water depths based on a frequency difference between the sound wave emitted from the wave transmitter and the average frequency of each of the sampling periods.

3. A method of measuring a ship's speed relative to water on which the ship is floating, the method comprising:
    emitting a sound wave toward a bottom of the water on which the ship is floating;
    detecting a plurality of reflected waves reflected by a plurality of reflecting objects respectively positioned at different water depths, the reflected waves being respectively waves obtained by reflecting the emitted sound wave by means of the plurality of reflecting objects; and calculating the speed of the ship relative to the water on which the ship is floating based on a frequency difference between the sound wave and each of the reflected waves, wherein the calculating step includes:

calculating a current velocity at each of a plurality of different depths based on the frequency difference between the sound wave and the corresponding reflected wave;

calculating a change rate of the current velocity in a depth direction of the water on which the ship is floating based on the calculated current velocities;

specifying one of the depths at which the change rate is substantially zero as a thickness of a boundary layer; and obtaining the current velocity at the specified depth as the speed of the ship relative to the water on which the ship is floating.

4. The method of measuring a ship's speed according to claim 3, wherein, upon obtaining a change rate of a current velocity in a water depth direction, the calculating step includes:

dividing a period from emission of the sound wave to emission of a next sound wave into a plurality of sampling periods, and obtaining an average frequency of the plurality of reflected waves detected in the sampling periods in each of the sampling periods, and obtaining current velocities at a plurality of different water depths based on a frequency difference between the sound wave and the average frequency of each of the sampling periods.

* * * * *